(12) United States Patent
Argenziano et al.

(10) Patent No.: US 11,795,664 B2
(45) Date of Patent: Oct. 24, 2023

(54) FOUR-LEGGED CONSTRUCTION MACHINE HAVING SLOPE STABILITY SYSTEM WITH LOCKING VALVES

(71) Applicant: Caterpillar Paving Products Inc., Brooklyn Park, MN (US)

(72) Inventors: Nicholas J. Argenziano, Otsego, MN (US); Eric S. Engelmann, Delano, MN (US)

(73) Assignee: Caterpillar Paving Products, Inc., Brooklyn Park, MN (US)

( * ) Notice: Subject to any disclaimer, the term of this patent is extended or adjusted under 35 U.S.C. 154(b) by 318 days.

(21) Appl. No.: 17/176,950

(22) Filed: Feb. 16, 2021

(65) Prior Publication Data

US 2022/0259827 A1 Aug. 18, 2022

(51) Int. Cl.
*E02F 9/22* (2006.01)
*E02F 9/02* (2006.01)
*E02F 9/08* (2006.01)
*E01C 23/088* (2006.01)

(52) U.S. Cl.
CPC .......... *E02F 9/2257* (2013.01); *E01C 23/088* (2013.01); *E02F 9/028* (2013.01); *E02F 9/085* (2013.01); *E02F 9/2203* (2013.01); *E02F 9/2228* (2013.01); *E02F 9/2267* (2013.01)

(58) Field of Classification Search
CPC ......... E02F 9/2257; E02F 9/028; E02F 9/085; E02F 9/2203; E02F 9/2267; B60G 2300/32; B60G 2500/302; B60G 17/0165; B60G 2400/82
See application file for complete search history.

(56) References Cited

U.S. PATENT DOCUMENTS

| | | |
|---|---|---|
| 4,580,797 A | 4/1986 | Ericsson |
| 5,378,081 A | 1/1995 | Swisher, Jr. |
| 5,813,697 A | 9/1998 | Bargenquast et al. |
| 6,010,139 A | 1/2000 | Heyring et al. |
| 6,217,047 B1 | 4/2001 | Heyring et al. |
| 8,118,316 B2 | 2/2012 | Berning et al. |
| 9,085,857 B2 | 7/2015 | Held et al. |

(Continued)

FOREIGN PATENT DOCUMENTS

| | | |
|---|---|---|
| CN | 102937813 | 11/2015 |
| CN | 106938597 | 2/2018 |

(Continued)

*Primary Examiner* — Karen Beck
(74) *Attorney, Agent, or Firm* — Schwegman, Lundberg & Woessner

(57) ABSTRACT

A machine comprises a first ground engaging unit connected to a first leg, a second ground engaging unit connected to a second leg, and a hydraulic system to control heights of the legs, the hydraulic system comprises a fluid circuit to control fluid between the first and second legs, a load holding valve to allow fluid into the fluid circuit, a control valve system to let fluid into the load holding valve, the control valve connected to a hydraulic fluid source and a reservoir, a first lock valve to control flow of fluid between the first and second legs in a first direction, a second lock valve to control flow of fluid between the second and first legs in a second direction, and first and float valves configured to connect the first and second legs to the control valve system, respectively.

18 Claims, 9 Drawing Sheets

(56) References Cited

U.S. PATENT DOCUMENTS

| | | |
|---|---|---|
| 9,133,586 B2 | 9/2015 | Reuter et al. |
| 9,956,842 B2 | 5/2018 | Muir et al. |
| 2013/0153310 A1* | 6/2013 | Steffen ................. B60G 17/056 |
| | | 180/9.5 |
| 2014/0379227 A1* | 12/2014 | Reuter .................... E01C 23/08 |
| | | 299/1.5 |
| 2017/0291802 A1* | 10/2017 | Hao .......................... B66C 9/00 |
| 2020/0122538 A1 | 4/2020 | Engelmann et al. |
| 2021/0362557 A1 | 11/2021 | Stahl |

FOREIGN PATENT DOCUMENTS

| | | | | |
|---|---|---|---|---|
| CN | 110295639 A | * | 10/2019 | ................ E02F 9/00 |
| CN | 115071357 A | * | 9/2022 | |
| DE | 2844413.2 | | 9/1989 | |
| EP | 0940274 | | 9/1999 | |
| JP | 2017078302 | | 4/2017 | |
| WO | WO-2022112451 A1 | * | 6/2022 | ............. B60G 17/00 |

* cited by examiner

FOUR-LEGGED CONSTRUCTION MACHINE HAVING SLOPE STABILITY SYSTEM WITH LOCKING VALVES

TECHNICAL FIELD

The present application relates generally, but not by way of limitation, to slope control systems and methods for construction machines, such as cold planer machines and rotary mixer machines that can be used to remove or recycle paved surfaces. More particularly, the present application relates to slope control systems used to adjust movement of multi-legged propulsors for such machines.

BACKGROUND

Cold planer machines can be used to remove old or degraded pavement from surfaces such as roadways and parking lots. Rotary mixers can be used to recycle old or degraded pavement for reuse on the surfaces. The surfaces can extend over uneven terrain. As such, these machines can include systems for adjusting the vertical height and tilting of the machine, and a rotary cutting tool attached thereto, in order to, for example, provide a stable ride during transport operations and control the cutting depth and angle during milling operations.

U.S. Pat. No. 9,956,842 to Muir et al., entitled "System and Method for Controlling Stability of Milling Machines" and Publication No. US 2007/0098494 to Mares, entitled "Hydraulic Leveling Selection Circuit for a Work Machine" disclose construction machines for roadwork.

SUMMARY OF THE INVENTION

A machine comprises a frame, a plurality of ground engaging units, a plurality of vertically moveable legs, and a hydraulic system. The plurality of ground engaging units including a first rear ground engaging unit and a second rear ground engaging unit. The plurality of vertically moveable legs connect one of the plurality of ground engaging units to the frame. The plurality of vertically moveable legs include a first rear leg connected to the first rear ground engaging unit and a second rear leg connected to the second rear ground engaging unit. The hydraulic system controls a height of each of the plurality of vertically moveable legs. The hydraulic system comprises a fluid circuit to control fluid between the first rear leg and the second rear leg, a load holding valve to let fluid into and out of the fluid circuit, a control valve to let fluid into and out of the load holding valve, the control valve system connected to a source of pressurized hydraulic fluid and a fluid reservoir, a first lock valve to control flow of fluid from the first rear leg to the second rear leg in a first direction, a second lock valve to control flow of fluid from the second rear leg to the first rear leg in a second direction, a first float valve configured to connect the first rear leg to the control valve system, and a second float valve configured to connect the second rear leg to the control valve system.

A method for controlling side-to-side slope of a four-legged construction machine having multiple independent propulsors each mounted to a hydraulic lifting device can comprise adjusting a height of first and second rear hydraulic lifting devices of the multiple independent propulsors by connecting to a high pressure source, traversing a ground surface having a changing topography with the multiple independent propulsors, floating individual heights of the first and second rear hydraulic lifting devices in a fluid circuit, activating a lock valve positioned between the first and second rear hydraulic lifting devices to inhibit flow out of a piston-end of the first rear hydraulic lifting device, and activating a float valve positioned between the lock valve and the second rear hydraulic lifting device to connect a piston-end of the second rear hydraulic lifting device to a low pressure source.

DETAILED DESCRIPTION

Figure 1:
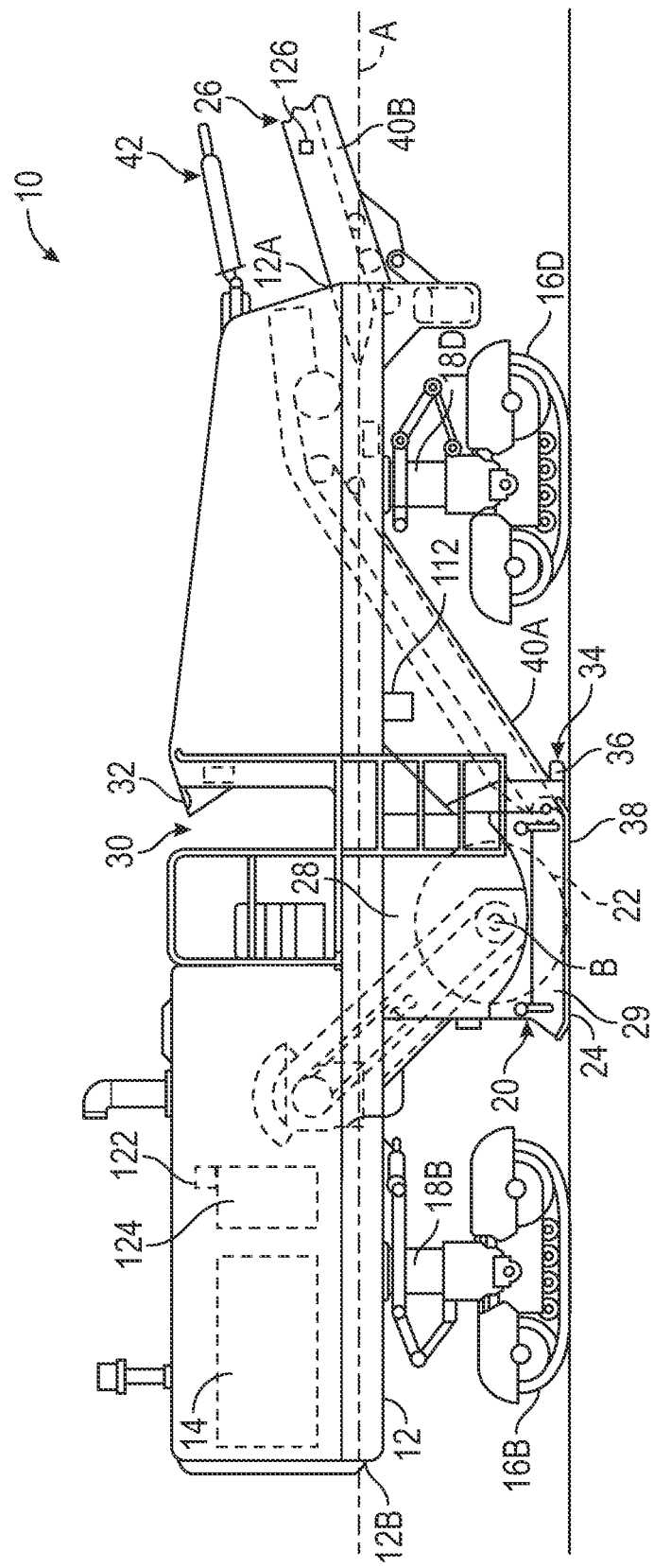
FIG. 1 is a schematic side view of a cold planer machine showing a milling system, an anti-slabbing system, a conveyor system and a plurality of transportation devices mounted to lifting columns.
Figure 4:
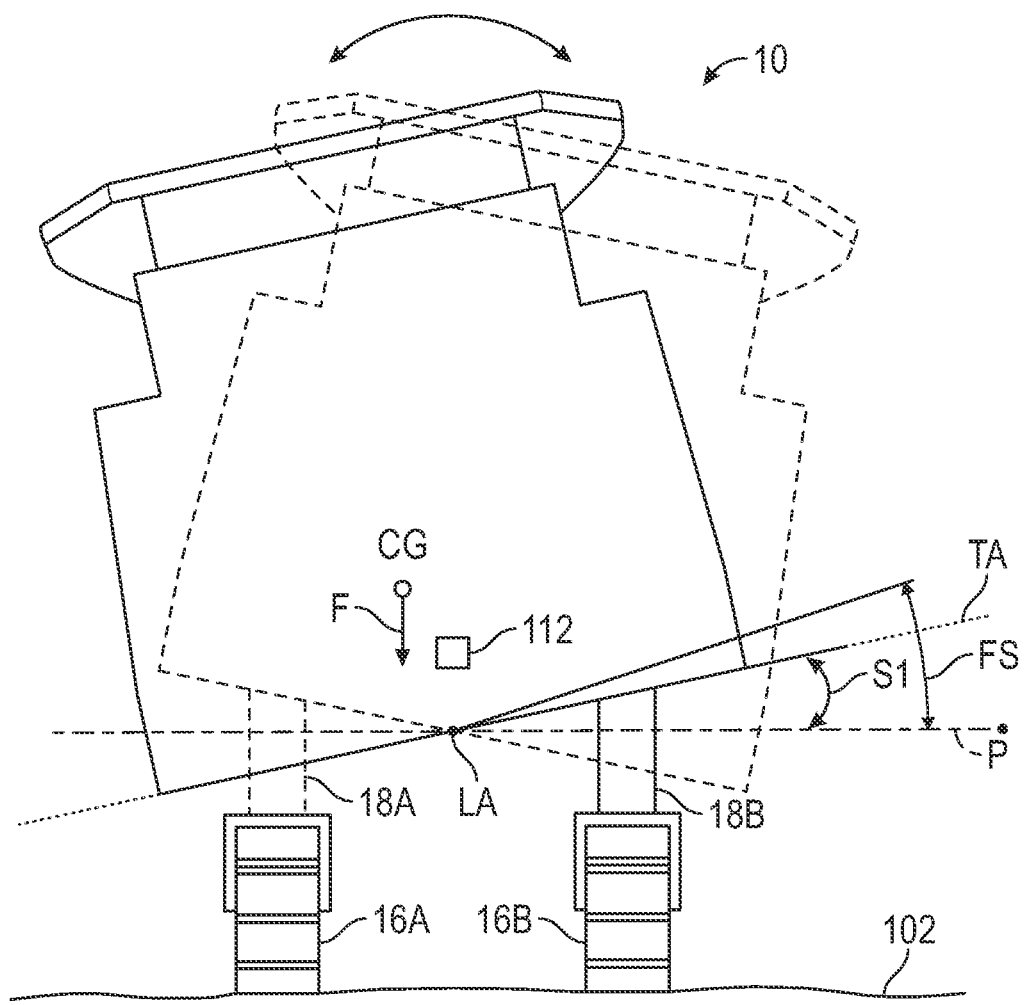
FIG. 4 is a schematic rear view of the cold planer machine of FIG. 1 showing rotation about a longitudinal axis and a center of gravity of the cold planer machine.
Figure 5:
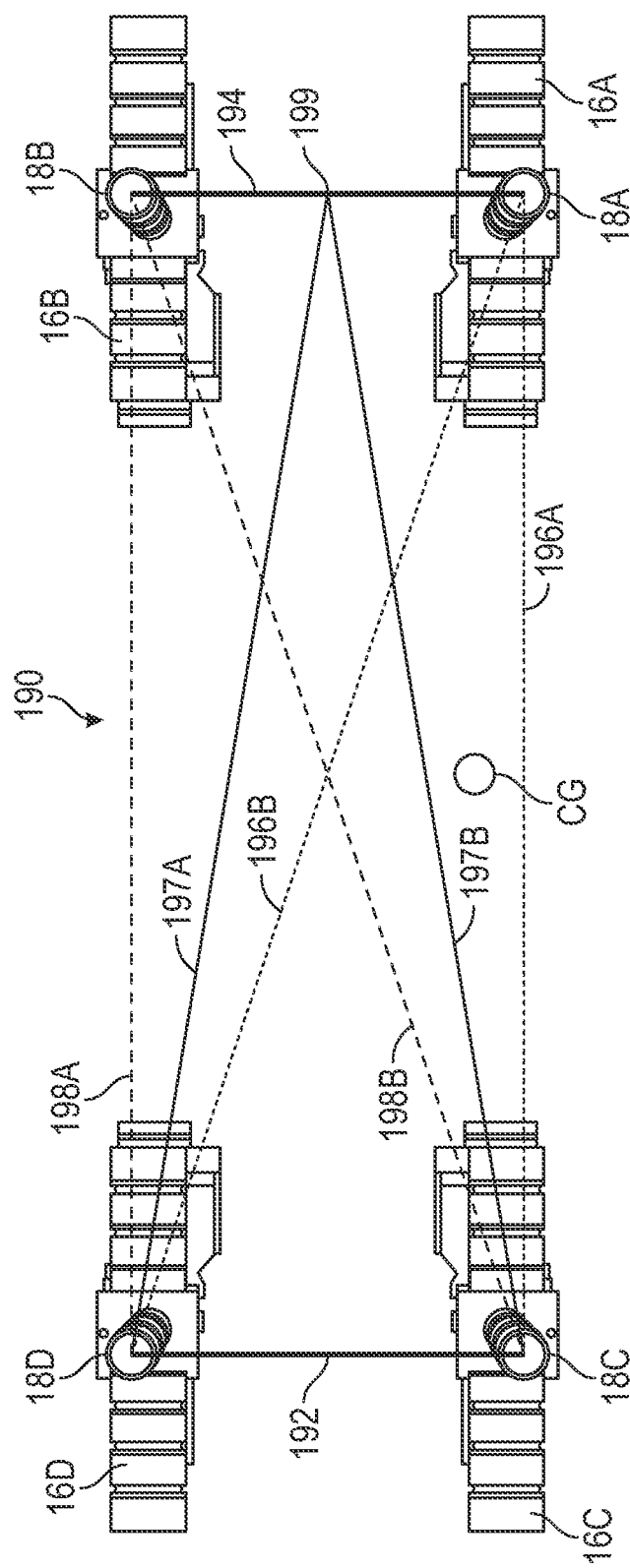
FIG. 5 is a schematic top view of the cold planer machine of FIG. 1 showing an operating envelope for the center of gravity of the cold planer machine of FIG. 4.

FIG. 1 is a schematic side view of cold planer machine 10 showing frame 12 to which power source 14 can be mounted to power transportation devices (propulsors) 16B and 16D to cause forward and backward movement of cold planer machine 10. Transportation devices 16A-16D can be connected to frame 12 via lifting columns 18A-8D, respectively, as shown in FIG. 5. As described with reference to FIG. 4, cold planer machine 10 can have a center of gravity (CG) that can move left and right as cold planer machine 10 rotates about longitudinal axis LA, e.g., tilts left and right. Center of gravity (CG) can have operating envelope 190 in which to safely move without cold planer machine 10 having risk, or significant risk, of tipping over or becoming unstable, as shown in FIG. 5. Controller 100 of FIG. 2 can be configured to operate in conjunction with rear hydraulic circuit 148 of FIG. 3 to operate rear lifting columns 18A and 18B to widen operating envelope 190 to the configuration of FIG. 5 as compared to conventional four-legged construction machines where operation of the rear lifting columns is tied to one another. In the present disclosure, rear hydraulic circuit 148 can include lock valves 128A-128B and float valves 129A-129B (FIG. 3) to allow rear lifting columns 18A and 18B to lockout relative to each other to enhance the stability of cold planer machine 10, while maintaining lifting and lowering capabilities as well as floating capabilities. Although the present application is written with reference to lock valves 128A and 128B and float valves 129A and 129B being applied to rear lifting columns, in other examples, cold planer machine 10 can be configured so that front lifting columns 18C and 18D are configured to float together and use valves 128A-129B, while rear lifting columns 18A and 18B can be individually controlled.

Milling assembly 20 can, for example, be coupled to the underside of frame 12 between transportation devices 16A-16D. Although the disclosure is described with reference to a cold planer machine including a milling drum and conveyors, the systems and methods of the present application can be applicable to other types of machines mounted on individually articulatable transportation devices, such as rotary mixing machines.

Frame 12 can longitudinally extend between first end 12A and second end 12B along frame axis A. Power source 14 can be provided in any number of different forms including, but not limited to, internal combustion engines, Otto and Diesel cycle internal combustion engines, electric motors, hybrid engines and the like. Power from power source 14 can be transmitted to various components and systems of machine 10, such as transportation devices 16A-16D and milling assembly 20.

Frame 12 can be supported by transportation devices 16A-16D via lifting columns 18A-18D. Transportation devices 16A-16D can be any kind of ground-engaging device that allows cold planer machine 10 to move, or be propelled, over a ground surface, for example a paved road or a ground already processed by cold planer machine 10, e.g., a propulsor. For example, in the illustrated example, transportation devices 16A-16D are configured as track assemblies or crawlers. However, in other examples, transportation devices 16A-16D can be configured as wheels, such as inflatable tires. Transportation devices 16A-16D can be configured to move cold planer machine 10 in forward and backward directions along the ground surface in the direction of axis A. Lifting columns 18A-18D can be configured to raise and lower frame 12 relative to transportation devices 16A-16D and the ground. Lifting columns 18A-18D can be configured to rotate to provide steering for cold planer machine 10, such as based on operator inputs.

Figure 2:
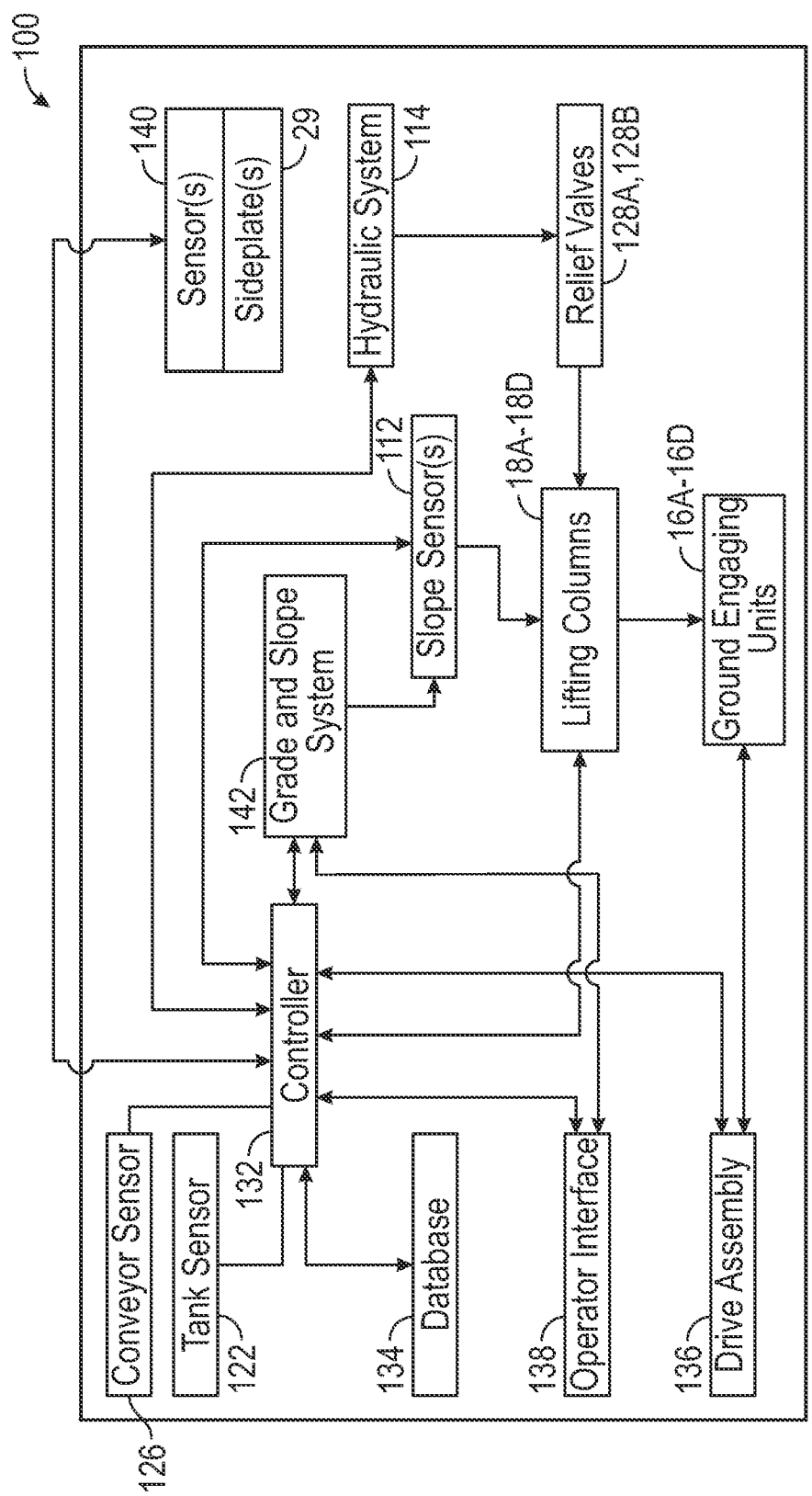
FIG. 2 is a schematic diagram of a control system for the cold planer machine of FIG. 1 illustrating a controller in communication with a hydraulic system for the lifting columns of FIG. 1.
Figure 3:
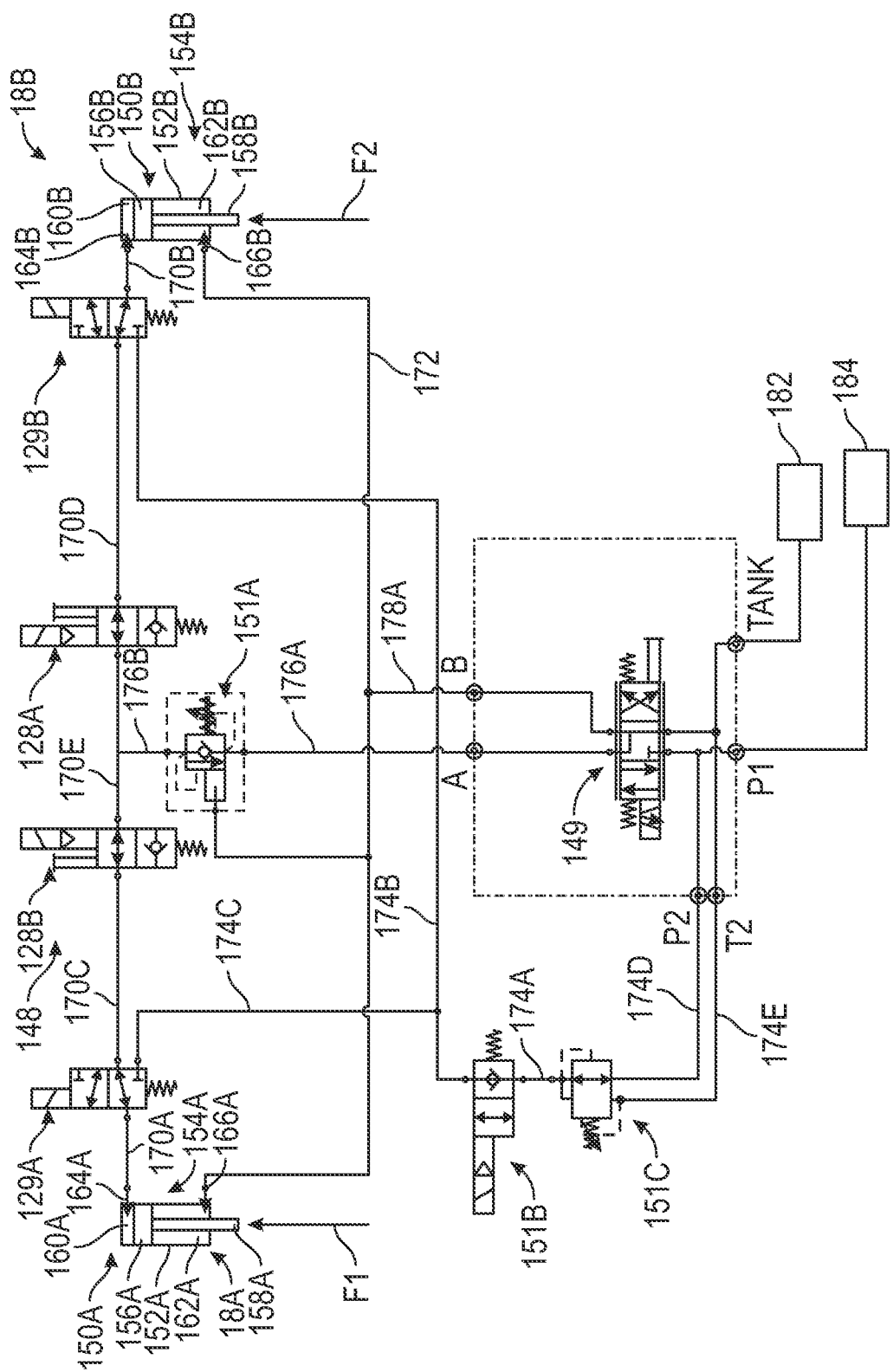
FIG. 3 is a schematic diagram of the hydraulic system for the lifting columns of the cold planer machine of FIGS. 1 and 2 including a rear hydraulic circuit including two lock valves and two float valves configured to provide lockout capabilities and floating capabilities to a left rear lifting column and a right rear lifting column.

Cold planer machine 10 can comprise four transportation devices: a front left transportation device 16C (FIG. 5), a front right transportation device 16D (FIG. 1), a rear left transportation device 16A (FIG. 5) and a rear right transportation device 16B (FIG. 1), each of which can be connected to one of lifting columns 18A-18D, respectively. That is, two additional transportation devices 16A and 16C can be provided aligned with the two transportation devices 16B and 16D shown in FIG. 1 further into the plane of FIG. 1, as can be seen in FIGS. 4 and 5. Although, the present disclosure is not limited to any particular number of transportation devices. Lifting columns 18A-18D can be provided to raise and lower frame 12 to, for example, control a cutting depth of milling drum 22 and to accommodate cold planer machine 10 engaging obstacles on the ground. As described herein, lifting columns 18A-18D can be coupled to a hydraulic system, such as hydraulic system 114 of FIG. 2, that can be operated by controller 132 receiving feedback from conveyor sensor 126, slope sensor 112, tank sensor 122, as well as lock valves 128A-128B and float valves 129A-129B (FIG. 3) or combinations thereof, as illustrated in FIGS. 2 and 3.

Cold planer machine 10 can further include milling assembly 20 connected to frame 12. Milling assembly 20 can comprise rotatable milling drum 22 operatively connected to power source 14. Milling drum 22 can include a plurality of cutting tools, such as chisels, disposed thereon. Milling drum 22 can be rotated about a drum or housing axis B extending in a direction perpendicular to frame axis A into the plane of FIG. 1. As rotatable milling drum 22 spins or rotates about drum axis B, the cutting tools may engage work surface 24, such as, for example, asphalt and concrete, of existing roadways, bridges, parking lots and the like. Moreover, as the cutting tools engage such work surface 24, the cutting tools remove layers of materials forming work surface, such as hardened dirt, rock or pavement. The spinning action of rotatable drum 22 and the cutting tools can then transfer the material of work surface 24 to conveyor system 26.

Milling assembly 20 can further comprise drum housing 28 forming a chamber for accommodating milling drum 22. Drum housing 28 can include front and rear walls, and a top cover positioned above milling drum 22. Furthermore, drum housing 28 can include lateral covers, or side plates 29, on the left and right sides of milling drum 22 with respect to a travel direction of cold planer machine 10. Drum housing 28 can be open toward the ground so that milling drum 22 can engage the ground from drum housing 28. Furthermore, drum housing 28 can be removed from frame 12 for maintenance, repair and transport.

In embodiments applicable to rotary mixers, drum housing 28 can be configured to contain milling drum 22 and form a mixing chamber. As such, milling drum 22 can be configured to contact a work surface during travel of the machine to reclaim and/or pulverize the work surface, such as by mixing reclaimed soil or paving material with various additives or aggregates deposited on the work surface. Thus, a rotary mixing machine of the present application can include systems for depositing an additive, such as Portland cement, lime, fly ash, cement kiln dust, etc., on the work surfaces during the reclaiming or pulverizing operations. In examples, cold planer machine 10 can comprise a fluid dispensing system connected to tank 124 for distributing fluid within tank 124 to drum housing 28 or onto the ground in front of or behind drum housing 28. Tank sensor 122 can be in fluid communication with tank 124 to, for example, sense the level of fluid in tank 124. The level of fluid within tank 124 can affect the center of gravity (CG) of cold planer machine 10. Tank 124 can be pressurized at atmospheric pressure. In additional examples, tank 124 can comprise a fuel tank for providing fuel to power source 14 and tank sensor 122 can be used to sense the level of fuel within tank 124.

Cold planer machine 10 can further include operator station or platform 30 including control panel 32 for inputting commands to control system 100 (FIG. 2) for controlling cold planer machine 10, and for outputting information related to an operation of cold planer machine 10. As such, an operator of cold planer machine 10 can perform control and monitoring functions of cold planer machine 10 from platform 30, such as by observing various data output by sensors located on cold planer machine 10, such as conveyor sensor 126, slope sensor 112 and tank sensor 122, as well as outputs of lock valves 128A-128B and float valves 129A-129B. For example, control panel 32 can include controls for operating transportation devices 16A-16D and hydraulic system 114 (FIG. 2) associated with lifting columns 18A-18D. Control panel 32 can also be configured to issue commands to lock valves 128A-128B and float valves 129A-129B, such as to switch valve positions and switch valve operations by powering on and off and the like.

Anti-slabbing system 34 can be coupled to drum housing 28 and can include an upwardly oriented base plate (not visible in FIG. 1) extending across a front side of the cutting chamber, a forwardly projecting plow 36 for pushing loose material lying upon work surface 24, and a plurality of skids 38.

Conveyor system 26 can comprise primary conveyor 40A and secondary conveyor 40B. Primary conveyor 40A can be positioned forward of milling drum 22 and can be coupled to and supported upon the base plate of anti-slabbing system 34. Primary conveyor 40A can feed material cut from work surface 24 via milling drum 22 to secondary conveyor 40B projecting forward of frame end 12A. Positioning mechanism 42 can be coupled to secondary conveyor 40B, to enable left, right, up and down position control of secondary conveyor 40B. Conveyor sensor 126 can be used by controller 132 to operate positioning mechanism 42 to adjust the position of secondary conveyor 40B. Conveyor sensor 126 can be used to sense the position of secondary conveyor 40B relative to, for example, frame 12. Secondary conveyor 40B can deposit removed work surface 24 into a receptacle, such as the box of a dump truck. In other construction machines, such as rotary mixer embodiments, conveyors 40A and 40B can be omitted.

Cold planer machine 10, as well as other exemplary road construction machines such as rotary mixers, can include further components not shown in the drawings, which are not described in further detail herein. For example, cold planer machine 10 can further include a fuel tank, a cooling system, a milling fluid spray system, various kinds of circuitry, etc.

Cold planer machine 10 can drive over work surface 24 such that front transportation devices 16C and 16D roll over work surface 24. Cold planer machine 10 can be configured to remove work surface 24 from a roadway to leave a planed surface behind. Rear transportation devices 16 And 16B can roll on the planed surface, with milling assembly 20 producing an edge of the material of work surface 24 between milled and un-milled surfaces of work surface 24. The milled surface can comprise a surface from which paving material has been completely removed or a surface of paving material from which an upper-most layer of paving material has been removed, or a surface comprising material mixed by milling assembly 20. Slope sensor 112 can be used to monitor cutting of milling drum 22 and the orientation of frame 12.

Cold planer machine 10 can be configured to travel in a forward direction (from left to right with reference to FIG. 1) to remove work surface 24. Anti-slabbing system 34 can travel over the top of work surface 24 to prevent or inhibit work surface 24 from becoming prematurely dislodged during operations for removal of work surface 24. Milling drum 22 can follow behind anti-slabbing system 34 to engage work surface 24. Milling drum 22 can be configured to rotate counter-clockwise with reference to FIG. 1 such that material of work surface 24 can be uplifted and broken up into small pieces by cutting teeth or chisels of milling drum 22. Anti-slabbing system 34 can be configured to contain pieces of work surface 24 within drum housing 28. Removed pieces of work surface 24 can be pushed up primary conveyor 40A and carried forward, such as by an endless belt, to secondary conveyor 40B. Secondary conveyor 40B can be cantilevered forward of front frame end 12A to be positioned over a collection vessel, such as the box of a dump truck. As such, the left-to-right position of secondary conveyor 40B, the up-and-down orientation of secondary conveyor 40B and the presence of material on secondary conveyor 40B can affect the location of center of gravity (CG) of cold planer machine 10.

During the course of moving over work surface 24, either with milling drum 22 engaging work surface 24 in an operating mode or with milling drum 22 retracted to a transport mode, transportation devices 16A-16D can encounter obstacles, such as hills, inclines, declines, depressions or protrusions, which are rolled over by transportation devices 16A-16D. Such obstacles tend to cause rods or pistons of lifting columns 18A-18D to be pushed inward into a cylinder of lifting columns 18A-18D or to extend further outward from the cylinder. Depending on the operating mode, this can cause one, two or more of lifting columns 18A-18D to actually move, while others are locked. Sometimes, these movements can potentially interfere with a cut being produced by milling drum 22. Furthermore, some of these obstacles can affect the location of center of gravity (CG) of cold planer machine 10, thereby affecting the stability of cold planar machine 10. In a cutting mode, where milling drum 22 is lowered to engage work surface 24 and front lifting columns 18C and 18D are locked into position, these movements can be particularly destabilizing. As discussed below, rear lifting columns that are floated together can narrow the rear portion of operating envelope 190 (FIG. 5) for center of gravity (CG) of cold planer machine 10.

The present application is directed to systems and methods for monitoring and controlling movements of lifting columns 18A-18D to, for example, maintain orientation of frame 12, maintain desired cut characteristics and maintain stability of cold planer machine 10. In particular examples, the hydraulic system for lifting columns 18A and 18B can be provided with lock valves 128A-128B and float valves 129A-129B (FIG. 3) to control and limit operation of rear lifting columns 18A and 18B of cold planer machine 10, such as during a cutting operation on a side-to-side slope, as illustrated in FIG. 4, based on, for example, operator input. In further examples, one or more of outputs from tank sensor 122, conveyor sensor 126 and slope sensor 112 can be used to maintain, limit or alter orientation of frame 12 and cold planer machine 10 by causing operation of lock valves 128A-128B and float valves 129A-129B with operator interaction or automatically with operation of control system 100. As discussed below, operation of lock valves 128A-128B and float valves 129A-129B can increase (e.g., widen) operational envelope 190 for the center of gravity (CG) of cold planer machine 10, as illustrated in FIG. 5, particularly compared to conventional rear lifting column hydraulic circuits where operation of the left and right lifting columns are tied together during all operational states.

FIG. 2 is an illustration of control system 100 for cold planer machine 10. Control of cold planer machine 10 can be managed by one or more embedded or integrated controllers 132 of cold planer machine 10. Controller 132 can comprise one or more processors, microprocessors, microcontrollers, electronic control modules (ECMs), electronic control units (ECUs), or any other suitable means for electronically controlling functionality of the cold planer machine 10.

Controller 132 can be configured to operate according to a predetermined algorithm or set of instructions for controlling cold planer machine 10 based on various operating conditions of cold planer machine 10 based on, for example, output of conveyor sensor 126, tank sensor 122 and slope sensor 112, as well as other sensor and operator inputs. In an example, controller 132 can execute instructions stored in memory of database 134 for performing the methods described with reference to FIG. 9. Such an algorithm or set of instructions can be stored in database 134 and can be read into an on-board memory of controller 132, or preprogrammed onto a storage medium or memory accessible by controller 132, for example, in the form of a floppy disk, hard drive, optical medium, random access memory (RAM), read-only memory (ROM), or any other suitable computer readable storage medium commonly used in the art (each referred to as a "database").

Controller 132 can be in electrical communication or connected to drive assembly 136, or the like, and various other components, systems or sub-systems of cold planer machine 10. Drive assembly 136 can comprise an engine or hydraulic motor among other elements (such as power source 14 of FIG. 1). By way of such connection, controller 132 can receive data pertaining to the current operating parameters of cold planer machine 10 from operator interface 132 and various sensors, such as conveyor sensor 126, slope sensor 112 and tank sensor 122, and the like. In response to such input, controller 132 may perform various determinations and transmit output signals corresponding to the results of such determinations or corresponding to actions that need to be performed, such as for producing forward and rearward movement using ground engaging units (such as transportation devices 16A-16D of FIG. 5) or producing up and down movements of lifting columns 18A-18D.

Controller 132, including operator interface 138, can include various output devices, such as screens, video displays, monitors and the like that can be used to display information, warnings, data, such as text, numbers, graphics, icons and the like, regarding the status of cold planer 10. Controller 132, including operator interface 138, can additionally include a plurality of input interfaces for receiving information and command signals from various switches and sensors associated with cold planer machine 10 and a plurality of output interfaces for sending control signals to various actuators associated with cold planer machine 10. Suitably programmed, controller 132 can serve many additional similar or wholly disparate functions as is well-known in the art.

With regard to input, controller 132 can receive signals or data from operator interface 138 (such as at control panel 32 of FIG. 1), slope sensor 112, conveyor sensor 126, tank sensor 122, side plate sensors 140, and the like. As can be seen in the example illustrated in FIG. 2, controller 132 can receive signals from operator interface 138. Such signals received by controller 132 from operator interface 138 can include, but are not limited to, an all-leg raise signal and an all-leg lower signal in which all lifting columns 18A-18D are commanded to raise or lower to increase or decrease the height of the machine and the associated cut depth. In some embodiments, front lifting columns 18C and 18D can be controlled individually directly, while rear lifting columns 18A and 18B can be controlled together indirectly based off movements of the front legs. Specifically, rear lifting columns 18A and 18B can be controlled using control valve 149 and load holding valve 151A, as well as lock valves 128A-128B and float valves 129A-129B of FIG. 3. Controller 132 can receive information from tank sensor 122, such as liquid or fluid level, and conveyor sensor 126, such as angular position and elevation of secondary conveyor 40B. Controller 132 can also receive data from one or more side plate sensors 140. Such data may include, but is not limited to, information related to the vertical position of side plate 29 and/or whether side plate 29 is in contact with surface 102.

Controller 132 can also receive data from other controllers, grade and slope system 142 for cold planer machine 10, operator interface 138, and the like. In examples, another controller may provide information to controller 132 regarding the operational status of cold planer machine 10. In other examples, such information may be provided by grade and slope system 142, or the like, to controller 132. The operation status received may include whether cold planer machine 10 is in non-milling operational status or milling operational status (e.g., milling drum 22 is not spinning or spinning).

In examples, grade and slope system 142 may receive and process data from operator interface 138 related to the operator desired depth of the cut, the slope of the cut, and the like. Grade and slope system 142 can comprise one or more slope sensors 112. Slope sensor 112 can detect rotation along longitudinal axis LA and transverse axis TA transverse to longitudinal axis LA (FIG. 4).

Controller 132 can also receive data from grade and slope system 142, such as from slope sensor 112, or operator interface 138 as to the operational status of the machine. Operational status received can include whether cold planer machine 10 is in milling operational status. Controller 132 and/or grade and slope system 142 can also provide information to as to the grade (the depth of the cut) and the slope of the cut to controller 132.

As discussed herein, stability of cold planer machine 10 can be related to the state of lifting columns 18A-18D, e.g., the length that a hydraulic piston for each is extended relative to a cylinder and the slope of terrain upon which cold planer machine 10 is situated. FIG. 5 shows lifting columns 18A-18D attached to propulsors 16A-16D, respectively, from a top view. Controller 132 can maintain operation of hydraulic system 114 based on sensor input and operator input to, for example, maintain stable operation of cold planer machine 10. In examples, controller 132 can operate hydraulic system 114 to maintain the center of gravity (CG) of cold planer machine 10 within operating envelope 190 (FIG. 5) that would prevent tipping of cold planer machine 10. In examples, hydraulic system 114 can be configured to self-regulate the center of gravity (CG) within operating envelope 190 based on pressures of hydraulic fluid used therein via lock valves 128A-128B and float valves 129A-129B (FIG. 3). For example, lock valves 128A-128B and float valves 129A-129B can be operated to prevent frame 12 from tilting beyond various angles that might position center of gravity (CG) outside of operating envelope 190. In examples, hydraulic system 114 can control the orientation of frame 12 based on the operational settings of cold planer machine 10 entered into controller 132 via operator interface 138. In particular, hydraulic system 114 can be put into a cutting mode where milling drum 22 is operating. In such a state, hydraulic system 114 can control side-to-side tilting of cold planer machine 10 by controlling the heights or lengths of lifting columns 18A-18D.

The individual heights of front lifting columns 18C and 18D can be controlled individually, such as by setting the cutting depth and angle of milling drum 22. The individual heights of rear lifting columns 18A and 18B at hydraulic cylinders 150A and 150B (FIG. 3) can be controlled collectively, based on the individual heights of lifting columns 18C and 18D. That is, the heights of lifting columns 18A and 18B together can be set to follow the heights for lifting columns 18C and 18D. As such, control valve 149 and load holding valve 151A can be controlled by an operator, such as via controller 132, to, for example, control the depth of a cut or the slope of a cut. In additional examples, control valve 149 and load holding valve 151A can be controlled automatically via controller 132 based on operator inputs. Lock valves 128A-128B and float valves 129A-129B can additionally be automatically controlled, controlled by controller 132 or manually controlled to adjust or lockout the length of lifting columns 18A and 18B to maintain or improve the stability of cold planer machine 10, while also maintaining lifting and lowering capabilities, as well as floating capabilities.

The height or lengths of rear lifting columns 18A and 18B can be controlled together and can be configured to float based on the orientations of front lifting columns 18C and 18D. Thus, one of front lifting columns 18A and 18B can be configured to move upward when traversing uneven terrain while the other is configured to move downward a proportional amount, or vice versa. Front lifting columns 18C and 18D can typically be operated by an operator and generally prevented from being extended or retracted too far by direct user interface. However, rear lifting columns 18A and 18B, because they are tied together in a floating operation, can potentially cause one of lifting columns 18A and 18B to extend or retract a greater amount than is desired. In particular, if cold planer machine 10 leans too far to the right or left, the lifting column into the direction in which cold planer machine 10 leans can contract too much, thereby causing the center of gravity (CG) of machine 10 to move outside of operating envelope 190 and thereby cause machine 10 to become unstable.

The present disclosure is directed to limiting movement of rear lifting columns 18A and 18B to prevent the center of gravity (CG) from moving outside of operating envelope 190. As shown in FIG. 5, operating envelope 190 of the present disclosure can be defined by upper boundary 192, lower boundary 194, left boundary 196A and right boundary 198A. If each of lifting columns 18A-18D were independently controllable (e.g., independently lockable), operating envelope would be as tall as lifting columns 18C and 18D are apart from lifting columns 118A and 18B and as wide as lifting columns 18C and 18A are apart from lifting columns 18D and 18B. However, in conventional four-legged construction machines, the heights of the rear lifting columns, or sometimes the front lifting columns, are often controlled together such that the nominal operating envelope becomes an isosceles triangle formed by boundaries 197A, 197B and 192, with points at lifting column 18C, lifting column 18D and midway between lifting columns 18A and 18B at point 199. Thus, the width of the operating envelope would be narrow near the rear lifting columns. Such configurations are common to help ensure simultaneous contact of all four of 16A-16D to the ground, even if the surface is not perfectly flat. With the present disclosure, however, the lengths of lifting columns 18A and 18B can be individually locked in particular scenarios using lock valves 128A-128B and float valves 129A-129B to move the bottom of operating envelope 190 out to rear lifting columns 18A and 18B, thereby increasing the width of the bottom of the operating envelope from a point to the width of lower boundary 194. The nominal operating envelope thereby shifts from an isosceles triangle to approximate a right triangle. Note, that the wheelbase of lifting columns 18A and 18B can differ from the wheelbase of lifting columns 18C and 18D such that a true right triangle may not actually be formed. Thus, with left rear lifting column 18A locked, the operating envelope 190 can be defined by upper boundary 192, left boundary 196A and right boundary 196B, and with right rear lifting column 18B locked, the operating envelope 190 can be defined by upper boundary 192, right boundary 198A and left boundary 198B. When superimposed together, there is more freedom for cold planer machine 10 to tilt left and right, as shown in FIG. 4, without the center of gravity (al) moving outside operating envelope 190.

Lock valves 128A-128B and float valves 129A-129B (FIG. 3) can be used to limit movement of one of the rear lifting columns 18A and 18B, while maintaining lowering and lifting capabilities for that lifting column and continuing to allow the other lifting column to float. Specifically, lock valves 128A and 128B can be used to lock one of lifting columns 18A and 18B, while one of float valves 129A and 129B can be used to allow the other lifting column to float to, for example, remain engaged with terrain, such as work surface 24. Additionally, lock valves 128A and 128B can be operated to raise or lower the locked (e.g., non-floating) lifting column. Operation of lock valves 128A-128B and float valves 129A-129B can be initiated manually based on direct operator engagement, or automatically by controller 132 using input from one or more of slope sensor 112, tank sensor 122 and conveyor sensor 126, or other sensors. Tank sensor 122 can sense the level of fluid within tank 124, which can affect the center of gravity (CG) of cold planer machine 10. For example, tank 124 can be located off-center on frame 12 (e.g., further to the left or right to accommodate flush cutting along one side of the machine) such that as the fluid within tank 124 becomes depleted, the center of gravity (CG) of cold planer machine 10 can change. Thus, controller 132 can receive data from tank sensor 122 to facilitate determining of the center of gravity (CG) of machine 10 taking into account the effects of the weight of tank 124. Controller 132 can also receive data from conveyor sensor 126, such as the left-to-right angle of secondary conveyor 40B and the elevational position of secondary conveyor 40B. As secondary conveyor 40B moves, particularly left-to-right, the weight of secondary conveyor 40B as well as the weight of material in or on secondary conveyor 40B can affect the center of gravity (CG) of cold planer machine 10. Thus, controller 132 can receive data from conveyor sensor 126 to facilitate determining of the center of gravity (CG) of machine 10 taking into account the effects of the secondary conveyor 40B. Database 134 can be provided with information relating to how fluid levels within tank 124 affect or position the center of gravity (CG) of cold planer machine 10 within operating envelope 190. Database 134 can be provided with information relating to how the position of secondary conveyor 40B affects the center of gravity (CG) of cold planer machine 10. As such, as discussed below, operation of rear lifting columns 18A and 18B can be controlled based on operation of controller 132 using, for example, sensor inputs or operator inputs.

FIG. 3 is a schematic illustration of rear hydraulic circuit 148 for rear lifting columns 18A and 18B of cold planer machine 10 including a pair of lock valves 128A and 128B and a pair of float valves 129A and 129B. Rear hydraulic circuit 148 can comprise a sub-system of hydraulic system 114 for controlling lifting columns 18A and 18B, where hydraulic system 114 can control all of lifting columns 18A-18D for cold planer machine 10. Hydraulic circuit 148 can comprise hydraulic cylinders 150A and 150B, which can comprise rear left and rear right lifting columns 18A and 18B. Hydraulic system 148 can further comprise load holding valve 151A. Load holding valve 151A can be in communication with control valve 149, which can comprise flow between hydraulic circuit 148 and the rest of hydraulic system 114, e.g., portions configured to control front lifting columns 18C and 18D. Control valve 149 can also be in communication with float pressure valve 151B, which can be coupled with low pressure supply valve 151C. Control valve 149, float pressure valve 151B and low pressure supply valve 151C can comprise a control valve system.

Hydraulic cylinders 150A and 150B can include housings 152A and 152B and piston assemblies 154A and 154B, respectively, located slidably therein. Each of housings 152A and 152B can include a hollow bored interior, and each of piston assemblies 154A and 154B can include cylinder pistons 156A and 156B, respectively, configured to fit closely within the bore, and piston rods 158A and 158B operatively connected to cylinder pistons 156A and 156B. Piston assemblies 154A and 154B can divide their respective cylinder housings 152A and 152B into upper chambers, or bore ends, 160A and 160B and lower chambers, or rod ends, 162A and 162B. Upper chambers 160A and 160B can include outlets 164A and 164B that can direct pressurized hydraulic fluid, such as from pressure 184, out of or into upper chambers 160A and 160B. Lower chambers 162A and 162B can include outlets 166A and 166B to allow hydraulic fluid to connect with tank 182. Pressure sensors can be located at one or more of outlets 164A and 164B and outlets 166A and 166B in order to provide pressure output data to controller 132 to for example, determine the location of the CG of machine 10 and/or initiate operation of one or more valves 128A-129B as described herein.

Outlet 164A of upper chamber 160A of hydraulic cylinder 150A can be connected to outlet 164B of upper chamber 160B of hydraulic cylinder 150B via lines 170A-170F. Line 170A can connect upper chamber 160A with float valve 129A. Line 170B can connect upper chamber 160B with float valve 129B. Line 170C can connect float valve 129A with lock valve 128B. Line 170D can connect float valve 129B with lock valve 128A. Line 170E can connect lock valve 128B and lock valve 128A. Lower chamber 162A can be connected to lower chamber 162B via line 177.

Float pressure valve 151B can be connected to low pressure supply valve 151C via line 174A. Float pressure valve 151B can be connected to float valve 129A via line 174B and line 174C. Float pressure valve 151B can be connected to float valve 129B via line 174B. Low pressure supply valve 151C can be connected to pressure 184 via line 174D. Low pressure supply valve 151C can be connected to tank 182 via line 174E.

Load holding valve 151A can be connected to control valve 149 via line 176A and cylinders 150A and 150B via line 176B. Load holding valve 151A and control valve 149 can be connected to each other via line 178A.

Lock valves 128A and 128B can comprise two-way valves that can switch between an open position in which bi-direction flow therethrough is freely permitted (a free-flow configuration), and a closed position in which a check valve only allows one-way flow (a checked-flow configuration). When not activated, or not powered, lock valves 128A and 128B can default to the closed position.

Float pressure valve 151B can be configured similarly as valves 128A and 128B. Low pressure supply valve 151C can comprise a pressure reducing relieving valve. Control valve 149 can comprise a three-way valve having a first configuration allowing two different fluids to pass through to first and second sources (e.g., high pressure fluid in and low pressure fluid out), a second configuration configured to connect two different fluid to the same source (e.g., a fluid tank), and a third configuration configured to allow two different fluids to connect to the second and first sources (e.g., an opposite configuration as the first configuration).

Float valves 129A and 129B can comprise two-way valves that can switch between positions that connect upper chambers 160A and 160B to different fluid lines. In a default powered-off mode, float valves 129A and 129B can connect upper chambers 160A and 160B to lock valves 128B and 128A, respectively (a first directional flow configuration). In a powered-on mode, float valves 129A and 129B can connect upper chambers 160A and 160B to float pressure valve 151B (a second directional flow configuration).

As shown in FIG. 3, during normal operation of cold planer machine 10, control valve 149 can be operated to allow a desired amount of fluid into rear hydraulic circuit 148. During normal operation, lock valves 128A and 128B can be powered to the on or open state where fluid flow is permitted therethrough and float valves 129A and 129B can be unpowered in the default position to connect upper chambers 160A and 160B to each other. Float pressure valve 151B can additionally be unpowered in the default closed position.

Control valve 149 can be operated to perform "leg raise" and "leg lower" operations in which all lifting columns 18A-18D (legs) are extended from or retracted into their respective cylinders to control the height of frame 12 above the ground, as well as the left-to-right slope of the machine to control the cut angle of milling drum 22. Thus, with load holding valve 151A open, control valve 149 can push additional hydraulic fluid into lines 170A-170E via coupling to pressure 184 (e.g., a pump) or can allow hydraulic fluid to drain out of rear hydraulic circuit 148 by connecting to tank 182 (e.g., a hydraulic fluid reservoir). After rear hydraulic circuit 148 is adjusted to the desired fluid level, load holding valve 151A can be closed, such as by a user input, to prevent hydraulic fluid from leaving rear hydraulic circuit 148. Specifically, hydraulic fluid cannot leave the flow space between upper chambers 160A and 160B, and hydraulic fluid cannot leave the flow space between lower chambers 162A and 162B. As such, hydraulic fluid can only move around rear hydraulic circuit 148 in a distributive manner. Specifically, as transportation devices 16A-16D (FIG. 5) traverse terrain, cylinders 150A and 150B will be equally positioned on level ground, such that force F1 and force F2 are approximately equal. However, if one of cylinders 150A and 150B extends, the other will retract. Thus, if cold planer machine 10 were to tilt to the left in FIG. 3, piston assembly 154A would tend to retract, while piston assembly 154B would tend to extend. Thus, hydraulic fluid would move from upper chamber 160A to upper chamber 160B via lines 170A-170E, and from lower chamber 162B to lower chamber 162A via line 172. Lock valves 128A and 128E can be powered to an open state to allow flow of fluid therethrough. Pressure in upper chamber 160A would temporarily rise before the hydraulic fluid is redistributed to upper chamber 160B. Likewise, pressure would temporarily rise in lower chamber 162B before the hydraulic fluid is redistributed to lower chamber 162A.

As discussed herein, lock valves 128A and 128B can be used to limit flow of fluid between hydraulic cylinders 150A and 150B, such as when load holding valve 151A is closed. Float valves 129A and 129B can be used to allow the non-locked leg to float. Lock valves 128A and 128B and control valve 149 can additionally be used to raise and lower the locked leg.

Figure 6:
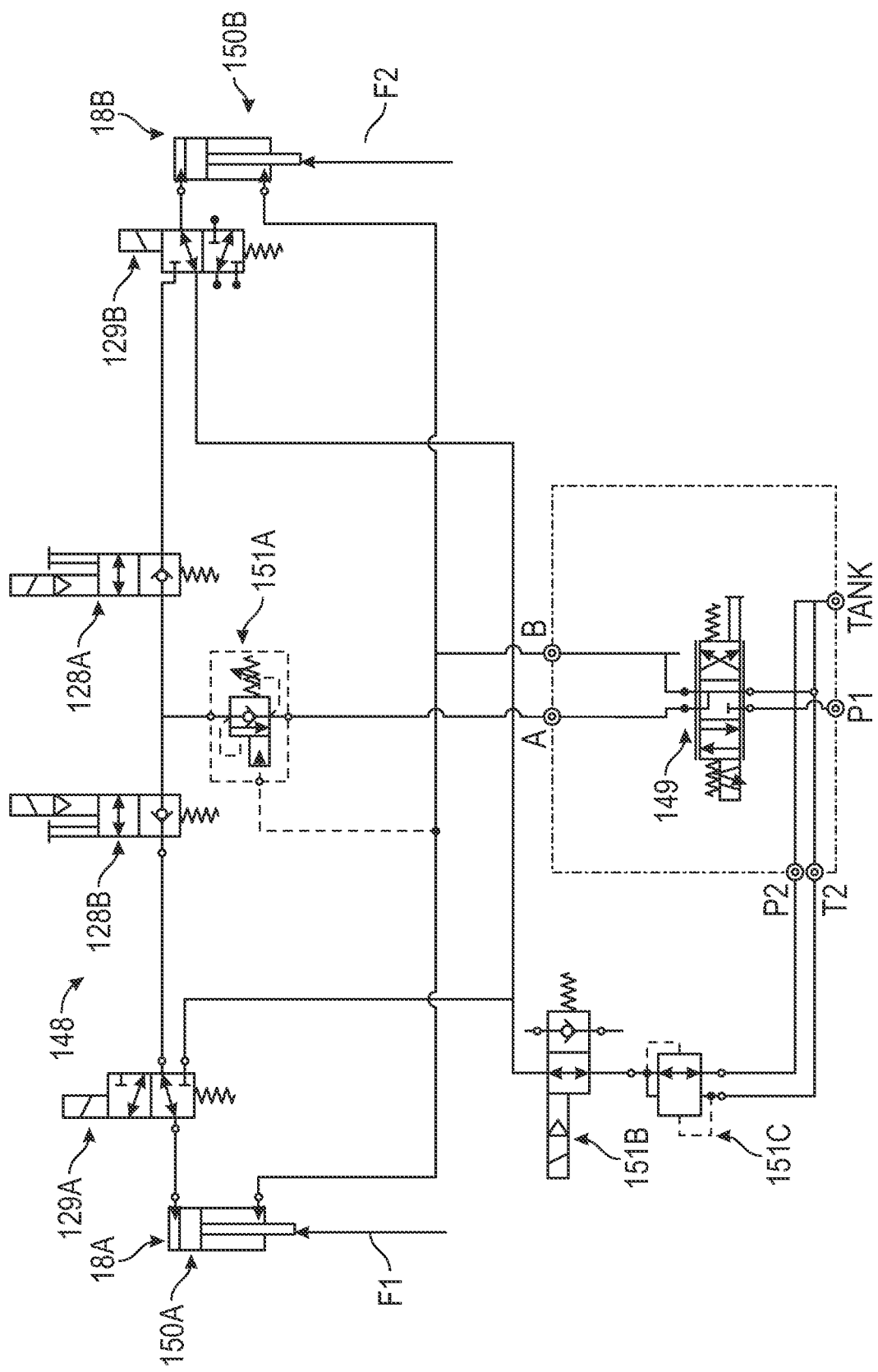
FIG. 6 is the schematic diagram of the hydraulic system of FIG. 3 shown with one lifting column locked and one lifting column floating.

FIG. 6 shows the scenario where work surface 24 slopes down to the left such that lifting column 18A is lower than lifting column 18B. As a result, force F1 pushing against piston assembly 154A will be greater than force F2 pushing against piston assembly 154B. In the scenario where cold planar machine 10 is leaning to the left, lock valves 128A and 128B can be un-powered to restrict flow therethrough and float valve 129B can become powered. Lock valves 128A and 128B act as check valves wherein lock valve 128B permits flow to the right, but lock valve 128A does not, (Conversely, lock valve 128A permits flow to the left, but lock valve 128B does not to facilitate locking of lifting column 18B in the opposite scenario.) As such, fluid cannot leave upper chamber 160A due to lock valve 128A not permitting flow to the right in FIG. 6. Thus, the addition of force F1 at piston assembly 154A will not force any additional fluid out of upper chamber 160A. Lower chamber 162B continues to be connected to tank 182 via line 172 and 178A. However, lifting cylinder 150B becomes connected to float pressure valve 151B and low pressure supply valve 151C via activation of float valve 129B. Thus, float valve 129B can be activated so that upper chamber 160B is connected to float pressure valve 151B through line 174B. Float pressure valve 151B can be activated to open and connect to low pressure supply valve 151C, which can provide pressurized fluid to upper chamber 160B by being connected to pressure 184. However, full pressure P1 of pressure 184 can be reduced to P2 by low pressure supply valve 151C returning a portion of fluid from pressure 184 back to tank 182. Low pressure supply valve 151C and float pressure valve 151B can comprise a low pressure source, while pressure 184 can comprise a high pressure source (e.g., greater than the low pressure source). Thus, float pressure valve 151B only receives a proportion of the pressure of P1 of pressure 184. Lower chamber 162B can be connected to tank via line 178A and control valve 149. Even though lifting column 18A is locked at a particular height, lifting column 18B can float by being extended by pressure P2, which is less than pressure P1 of pressure 184. Thus, when transportation device 16B is disengaged from surface 24, such as when traversing a depression, pressure P2 can provide enough force to extend lifting column 18B to reengage transportation device 16B with surface 24. Low pressure P2 can be sufficient to extend lifting column 18B to enable transportation device 16B to engage terrain and gain traction, but not enough to cause lifting column 18B to lift frame 12. Similarly, transportation device 16B can retract when engaging a protrusion in surface 24 due to pressure P2 being configured to be only powerful enough to extend lifting column 18B to engage surface 24 to provide some degree of traction.

The locking of lifting column 18A moves the lower left corner of operating envelope 190 (FIG. 5) to the position of lifting column 18A, widening operating envelope 190 to the left as compared to when lifting columns 18A and 18B are floating together. Lock valve 128B and float valve 129B can be configured to operate in the same manner to limit movement of lifting column 18B and float lifting column 18A when cold planer machine 10 leans to the right.

Figure 7:
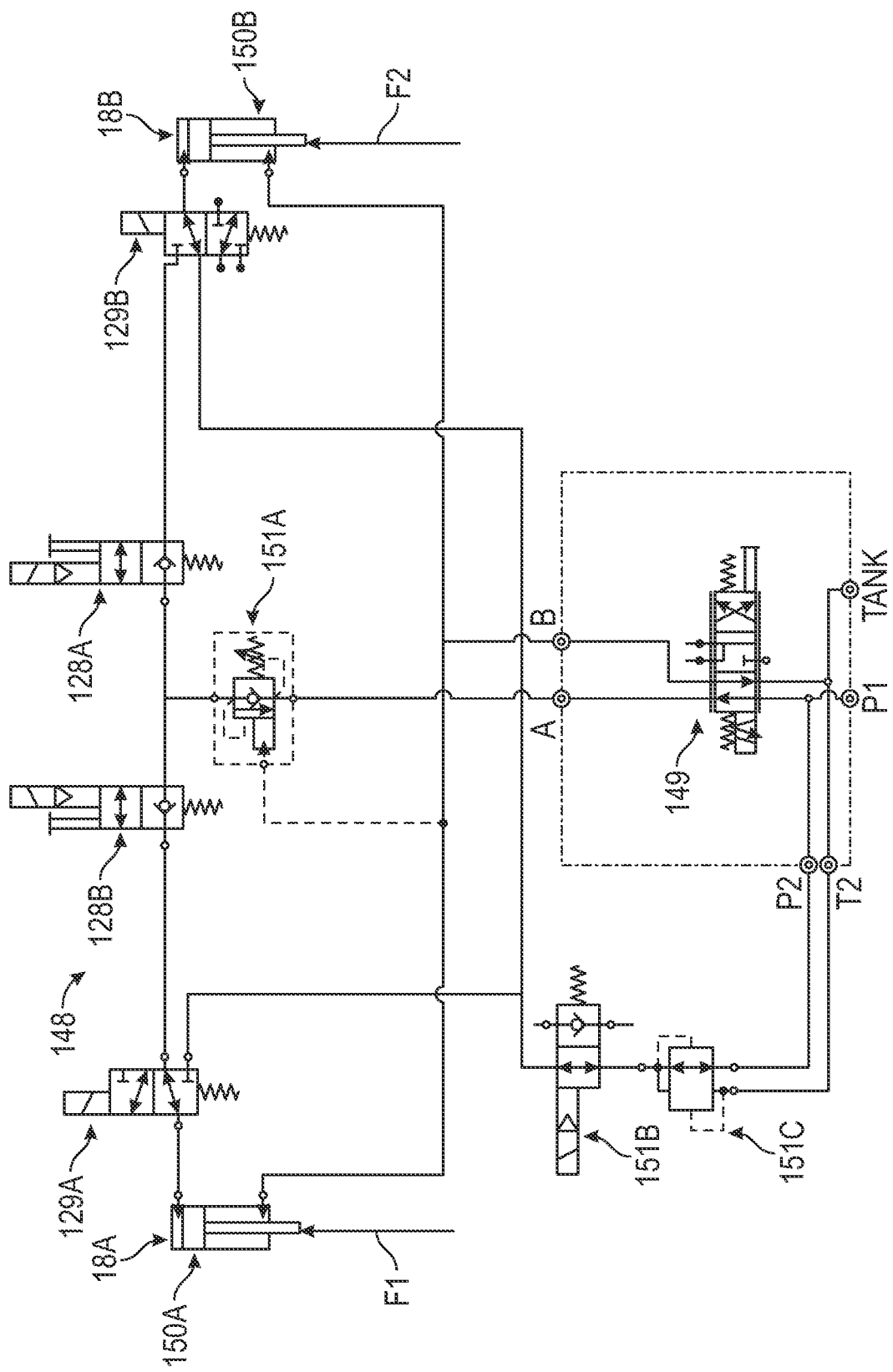
FIG. 7 is the schematic diagram of the hydraulic system of FIG. 3 shown with one locked lifting column being raised and the other lifting column floating.

As shown in FIG. 7, rear hydraulic circuit 148 can additionally execute a "leg raise" command while left lifting column 18A is locked and right lifting column 18B is floating. From the configuration of FIG. 6, left lifting column ISA can be configured to be raised independently of lifting column 18B. Thus, control valve 149 can be configured to connect pressure 184 to load holding valve 151A via line 176A, load holding valve 151A can be moved to connect line 176A to lock valve 128B via line 170F, and lock valve 128B can be moved to connect line 170F to upper chamber 160A via line 170C. Thus, upper chamber 160A can be connected to pressure 184, with lock valve 128B being moved to a flow-through state. Movement of control valve 149 can additionally connect tank 182 to lower chamber 162A via line 178A and line 172. Thus, as pressure 184 introduces high pressure hydraulic fluid, at P1, into upper chamber 160A, lower pressure hydraulic fluid in lower chamber 162A can be released to tank 182 via line 172 and line 178A. Lifting column 18B can continue operating in a float mode via control valve 149 simultaneously connecting lower chamber 162B to tank 182, with float pressure valve 151B and low pressure supply valve 151C being connected to upper chamber 160B.

Figure 8:
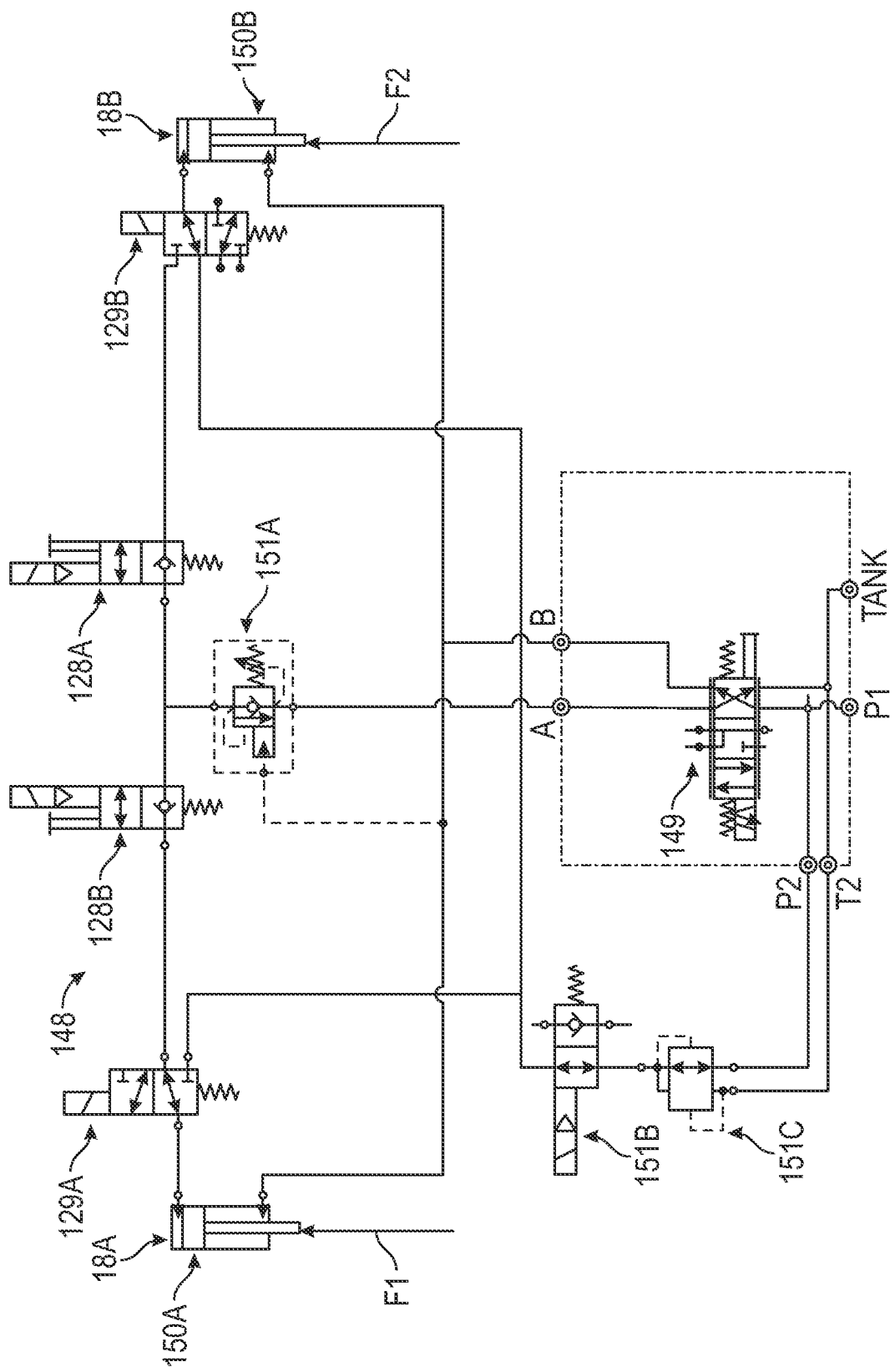
FIG. 8 is the schematic diagram of the hydraulic system of FIG. 3 shown with one locked lifting column being lowered and the other lifting column floating.

As shown in FIG. 8, rear hydraulic circuit 148 can additionally execute a "leg lower" command while left lifting column 18A is locked and right lifting column 18B is floating. In order to lower lifting column 18A, valves 128A, 128B, 129A and 129B can be returned to the configuration of FIG. 6 so that valves 128A and 128B are powered to closed positions and valves 129A and 129B are connecting upper chambers 160A and 160B with valves 128A and 128B. Thereafter, control valve 149 can be moved to connect tank 182 to line 176A, thus allowing fluid within upper chamber 160A to exit upper chamber 160A and pass through valve 129A and valve 128B to enter line 176A, Load holding valve 151A can allow flow therethrough in the leg lower mode. Lifting column 18B can continue operating in a float mode via control valve 149 simultaneously connecting lower chamber 162B to tank 182, with float pressure valve 151B and low pressure supply valve 151C being connected to upper chamber 160B.

In examples, system 100 can be configured to limit the orientation of frame 12 based on input from one or a combination of various sensors of cold planer machine 10, such as conveyor sensor 126, tank sensor 122 and slope sensor 112. In additional examples, controller 132 can be configured to detect (via integrated pressure sensors) pressure change in hydraulic cylinders 150A and 150B at lock valves 128A and 128B and/or float valves 129A and 129B associated with a change in topography of the surface over which cold planer machine 10 is traversing, such as surface 24. For example, as one of transportation devices 16A or 16B engages a protrusion in surface 24 or a depression in surface 24, or cold planer machine 10 is traversing a side-to-side lateral slope, an associated pressure spike or pressure drop, respectively, can occur with the associated hydraulic cylinder 150A and 150B. Controller 132 can, in response to a pressure change at one lifting column 18A and 18B, either sensed directly or determined via proxy through tank sensor 122 and conveyor sensor 126, cause one or more other lock valves 128A and 128B and float valves 129A and 129B to activate to prevent one or more of lifting columns 18A and 18B from changing height, such as to prevent frame 12 from changing orientation to a point where the center of gravity (CG) goes outside of operating envelope 190. Additionally, an operator of cold planer machine 10 can manually receive information from controller 132, such as via operator interface 138, and manually adjust lock valves 128A and 128B and float valves 129A and 129B.

System 100 can include slope sensor 112 disposed on frame 12. In examples, slope sensor 112 can be positioned near the longitudinal and lateral center of frame 12. Slope sensor 112 can be configured to generate a signal indicative of the slope of cold planer machine 10. As shown in FIG. 4, the slope of cold planer machine 10 can be defined with respect to a movement of frame 12 about longitudinal axis LA (FIG. 4), which can be coincident with axis A of FIG. 1, extending in a direction of travel of machine 10, and a transverse axis TA extending left-to-right across machine 10 perpendicular to longitudinal axis LA. The slope of cold planer machine 10 can be defined with respect to a movement of cold planer machine 10 and with respect to a horizontal plane P perpendicular to a direction of a gravitational force F of cold planer machine 10. The gravitational force F may correspond to a force caused by a weight of cold planer machine 10 at a center of gravity CG thereof towards the ground surface 102 (such as the top of work surface 24 of FIG. 1). The horizontal plane P is hereinafter referred to as the reference plane P. A tilting of machine 10 to cause center of gravity (CG) to move outside of operating envelope 190 can comprise threshold orientation of machine 10 at which lock valves 128A-128B and float valves 129A-129B can be triggered. Threshold orientation of machine 10 including for various levels in tank 124 and orientations of secondary conveyor 40B can be stored in database 134 based on, for example, predetermined calculations.

In the illustrated example, slope sensor 112 is located on frame 12 between the front and rear transportation devices 16C and 16D, and 16A and 16B, respectively, as shown in FIG. 1. Slope sensor 112 can additionally be located between left and right transportation devices 16C and 16A, and 16D and 16B, respectively. In additional examples, slope sensor 112 can be disposed on frame 12 around an intersecting location defined by longitudinal axis LA and TA transverse axis of cold planer machine 10. In other examples, slope sensor 112 can be disposed at any location in frame 12 to generate the signal indicative of the slope of cold planer machine 10. In yet additional examples, a plurality of slope sensors 112 can be disposed at various locations in or on frame 12 of cold planer machine 10.

In examples, slope sensor 112 can comprise a dual-axis sensor for sensing movement along transverse axis TA and longitudinal axis LA. In additional examples, slope sensor 112 can include a gyro sensor. The gyro sensor may be configured to generate signals indicative of rotational attributes of cold planer machine 10, such as a pitch and a roll, as cold planer machine 10 traverses over terrain having varying topographical features such as bumps, hills, protrusions, obstacles, depressions, pot holes and the like, thereby causing a change or orientation of frame 12 about axes TA and LA. The pitch may correspond to the movement of cold planer machine 10 about the transverse axis TA and the roll may correspond to the movement of cold planer machine 10 about the longitudinal axis LA. In various examples, slope sensor 112 can include a sensor device, an angle measurement device, a force balancing member, a solid state member, a fluid filled device, an accelerometer, a tilt switch or any other device that can determine the slope of cold planer machine 10 with respect to one or more of the various reference parameters including, but not limited to, the reference plane P, the ground surface 102, longitudinal axis LA and the transverse axis TA of cold planer machine 10.

Controller 132 can be in communication with slope sensor 112, tank sensor 122 and conveyor sensor 126. Controller 132 can be configured to receive a signal indicative of the slope of cold planer machine 10 about the longitudinal axis LA and the transverse axis TA thereof generated by slope sensor 112. Controller 132 can be configured to receive signals indicative of the fill level of tank 124 from tank sensor 122. Controller 132 can be configured to receive signals indicative of the position of secondary conveyor 40B relative to frame 12 generated by conveyor sensor 126. Controller 132 can be disposed at control panel 32, but can be disposed on any location on frame 12.

Controller 132 can further be configured to be in communication with hydraulic system 114 controlling operation and position of lifting columns 18A-18B. In examples, hydraulic system 114 can include a reservoir, e.g., tank 182 for containing a hydraulic fluid and one or more pumps, pressure 184, to communicate pressure generated by the hydraulic fluid to lifting columns 18A-18D and transportation devices 16C-16B. Control valve 149 and load holding valve 151A (FIG. 3) can be disposed in hydraulic system 114 to control direction of flow of the hydraulic fluid into and out of rear hydraulic circuit 148. Furthermore, additional control valves, such as check valves, pressure relief valves, pressure regulating valves, and the like may be disposed in hydraulic system 114 for generating required hydraulic power for actuation of the front lifting columns 18C and 18D, as well as transportation devices 16A-16D. Thus, hydraulic system 114 in communication with controller 132 can be configured to actuate lifting columns 18A-18D based on an input received from controller 132. Likewise, control panel 32 can include operator inputs to control hydraulic system 114 through controller 132. Additionally, hydraulic system 114 or a separate hydraulic system can be in communication with transportation devices 16A-16D to provide hydraulic fluid for motive force for transportation devices 16 that can be additionally controlled by controller 132.

Controller 132 can be configured to determine a first slope S1 of cold planer machine 10 based on the signal received from slope sensor 112. The first slope S1 is a first angle defined by the longitudinal axis LA of cold planer machine 10. The first slope S1 is further defined with reference to the reference plane P perpendicular to the gravitational force F of cold planer machine 10. Controller 132 in communication with slope sensor 112 can receive a signal corresponding to the movement of cold planer machine 10 about the longitudinal axis LA thereof to determine the first slope S1. In various examples, controller 132 can determine the first slope S1 based on the reference parameters including the movement of cold planer machine 10 about the longitudinal axis LA, the reference plane P and the ground surface 102.

Controller 132 can be configured to determine a second slope S2 of cold planer machine 10 based on the signal received from slope sensor 112. The second slope S2 is a first angle defined by the transverse axis TA of cold planer machine 10. The second slope S2 is further defined with reference to the reference plane P perpendicular to the gravitational force F of cold planer machine 10. Controller 132 in communication with slope sensor 112 can receive a signal corresponding to the movement of cold planer machine 10 about the transverse axis TA thereof to determine the second slope S2. In various examples, controller 132 can determine the second slope S2 based on the reference parameters including the movement of cold planer machine 10 about the transverse axis TA, the reference plane P and the ground surface 102.

Controller 132 can be configured to determine a shift in the center of gravity (CG) of cold planer machine 10 based on input from tank sensor 122 and conveyor sensor 126. As discussed, database 134 can include information correlating the fill level of tank 124 with a change in the center of gravity (CG) of machine 10 and the position of secondary conveyor 40B with a change in the center of gravity (CG) of machine 10. Thus, the inputs from tank sensor 122 and conveyor sensor 126 can be used to determine how close the center of gravity (CG) of machine 10 is to operating envelope 190 and can, in response, determine if and when lock valves 128A-128B and float valves 129A-129B can be activated to prevent center of gravity (CG) from moving outside of operating envelope 190.

Using input from one or more of tank sensor 122, conveyor sensor 126 and slope sensor 112, controller 132 can be configured to move lock valves 128A-128B and float valves 129A-129B, as disclosed herein, to limit movement of one or both of lifting columns 18A and 18B to limit first slope S1 and second slope S2 in order to maintain a desired orientation or attitude of frame 12 and cold planer machine 10, e.g., beyond a threshold orientation. A desired orientation or attitude for frame 12 and cold planer machine 10 can be determined based on information stored in database 134 or a memory module of controller 132 relating to center of gravity (CG) and operating envelope 190. As such, data from one or more of slope sensor 112, tank sensor 122 and conveyor sensor 126 can be used to verify or confirm data from the others of slope sensor 112, tank sensor 122 and conveyor sensor 126, either before or after action is taken. For example, orientation of frame 12 can be read from slope sensor 112 and compared with an operator-input orientation. Then, lock valves 128A-128B and float valves 129A-129B can be operated to limit movement of lifting columns 18A and 18B to prevent frame 12 from moving the center of gravity (CG) out of operating envelope 190. Information from tank sensor 122 and conveyor sensor 126 can be compared with information from slope sensor 112 to verify correct and accurate operation of lifting columns 18A and 18B. In other examples, information from tank sensor 122 and conveyor sensor 126 can be used to verify operation of lock valves 128A-128B and float valves 129A-129B.

After frame 12 is moved to an orientation where center of gravity (CG) of cold planer machine 10 is back within operating envelope 190, lock valves 128A-128B and float valves 129A-129B can be reset to again allow fluid flow between upper chambers 160A and 160B and lower chambers 162A and 162B.

Controller 132 can obtain information from slope sensor 112, tank sensor 122 and conveyor sensor 126 to actuate lock valves 128A-128B and float valves 129A-129B in real-time to limit tilting of frame 12 of cold planer machine 10, via lifting columns 18A and 18B, to maintain various parameters, such as a preferred or desired orientation of frame 12 or cold planer machine 10 that 1) maintains a desired cut orientation of milling drum 22 [such as within a predetermined tolerance band relative to horizontal] such as by maintaining a ground inclination of frame 12 relative to the ground and 2) maintain the stability of cold planer machine 10, and other considerations.

In various examples, machine 10 can be configured to include only one of lock valves 128A-128B and float valves 129A-129B. In such a configuration lock out of only one of lifting columns 18A and 18B can be provided. Thus, machine 10 can be prevented from leaning too far (e.g., relative to an operating envelope) in only one direction. Such a configuration can be useful in machines where the center of gravity is off center. For example, some road work machines are configured with milling drum 22 configured to cut flush with the side of the machine. As such, other components can be shifted off center, such as fluid tanks.

Figure 9:
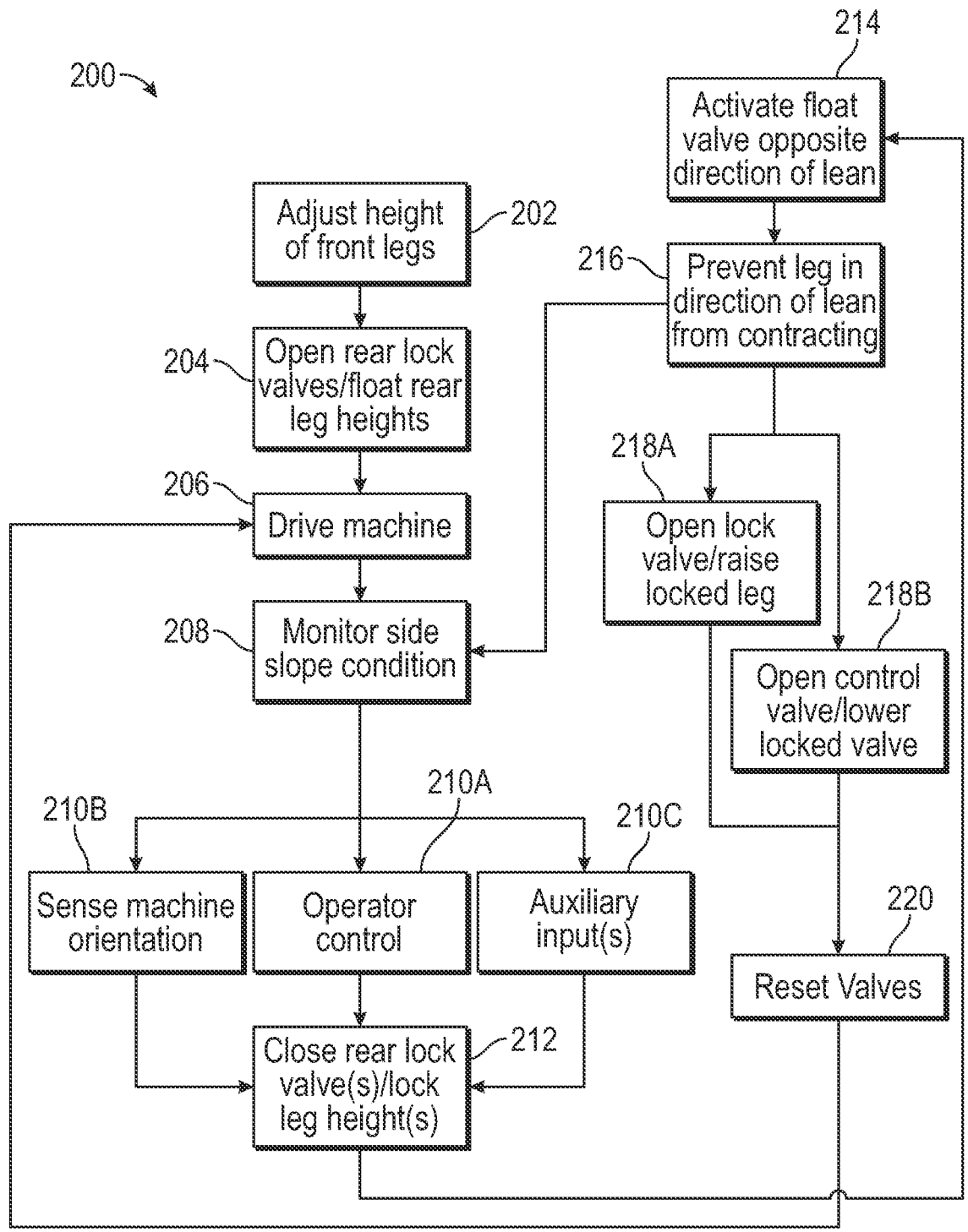
FIG. 9 is a block diagram illustrating methods of balancing slope of a cold planer machine using rear lifting column lock valves and float valves.

FIG. 9 is a block diagram illustrating methods 200 of balancing cold planer machine 10 using rear lifting column lock valves 128A-128B and float valves 129A-129B.

At step 202, the heights of lifting columns 18A-18D can be set, such as via a user input. The heights of lifting columns 18C and 18D can be controlled directly to, for example, determine a slope angle and depth of a cut of milling drum 22.

At step 204, the height of lifting columns 18A and 18B can be controlled together based on the depth of cut and can adjust their relative heights to adjust their slope angle. For example, hydraulic fluid can be let into or let out of rear hydraulic circuit 148 to collectively extend or retract lifting columns 18A and 18B. At step 204, lock valves 128A and 128B can be powered opened to allow fluid flow freely therethrough, and float valves 129A and 129B can be left in an un-powered default state connecting upper chambers 160A and 160B to lock valves 128A and 128B, respectively. As mentioned, although described with reference to front lifting columns 18C and 12D being operated independently at step 202 and rear lifting columns 18A and 18B being operated together at step 204, such configurations can be reversed so that the valves and steps 206 and beyond can be operated to control front lifting columns.

At step 206, cold planer machine 10 can be driven across terrain, such as work surface 24. The terrain can be uneven and can cause cold planer machine 10 to tilt to the left or tilt to the right, thereby moving the center of gravity (CG) of machine 10 toward an outer edge of operating envelope 190. For example, front lifting columns 18C and 18D can be locked into place to fix the cutting plane for milling drum 22, which can cause leaning of machine 10. Rear lifting columns 18A and 18B float to accommodate the leaning.

Hydraulic fluid can move back and forth between upper chambers 160A and 160B of hydraulic cylinders 150A and 150B and back and forth between lower chambers 162A and 162B of hydraulic cylinders 150A and 150B to float lifting columns 18A and 18B to accommodate changing slopes of the terrain.

At step 208, the slope of machine 10 can be monitored. For example, slope sensor 112 can be used to monitor the side-to-side (e.g., left-tip-right) slope of frame 12. Additionally, pressure in lines 170A-170E and 172 can be monitored to determine the height of lifting columns 18A and 18B attached thereto. In examples, pressure in lines 170A-170E and 172 can be directly monitored with pressure sensors.

Additionally, the slope of machine 10 can be monitored by taking into account factors that can influence leaning of machine 10. Such factors can include the influence of the weight of fluid within various tanks on machine 10, particularly those that are off center, and the influence of the position of conveyors cantilevered from frame 12. Thus, tank sensor 122 and conveyor sensor 126 can provide input to controller 132, which can be configured to calculate or assess the center of gravity (CG) of machine 10 for current operating conditions.

At steps 210A-210C, the various factors contributing to lean of machine 10 can be evaluated.

At step 210A, lock valves 128A-128B and float valves 129A-129B can be manually operated at a threshold center of gravity (CG) or at any time by a user, based on feedback provided at control panel 32, by operational requirements of cold planer machine 10 or operator visual assessment of work surface 24. The threshold center of gravity (CG) can comprise a pressure at which center of gravity (CG) of machine 10 is near or at a boundary of operating envelope 190. Controller 132 can be configured to calculate the current center of gravity (CG) of machine 10, based on the factors described herein, and compare the calculated center of gravity to values stored in a lookup table in database 134 to determine where the center of gravity is compared to operating envelope 190. As such, operating envelop 190 can comprise a plurality of center of gravity values defining a perimeter within which center of gravity (CG) can remain. The current center of gravity (CG) of machine 10 relative to operating envelope 190 can be communicated to an operator of machine 10 at control panel 32 so that the operator can take action as desired.

At step 210B, the orientation of machine 10 can be determined from slope sensor 112. The sensed slope of slope sensor 112 can be used in calculations of controller 132 in evaluating the center of gravity (CG) of machine 10 and operating envelope 190. Information from slope sensor 112 can be displayed at control panel 32 to facilitate manual operation of valves 128A and 128B and valves 129A and 129B or to facilitate automatic operation of such valves by controller 132.

At step 210C, auxiliary inputs into controller 132 can be used to determine a fill level of tank 124 and a position of secondary conveyor 40B. The fill level and conveyor position can be used by controller 132 in evaluating the center of gravity (CG) of machine 10 and operating envelope 190. Information from tank sensor 122 and conveyor sensor 126 can be displayed at control panel 32 to facilitate manual operation of valves 128A and 128B and valves 129A and 129B or to facilitate automatic operation of such valves by controller 132.

At step 212, lock valves 128A and 128B can be operated when a threshold condition is met. The threshold condition can be a user determination. The threshold condition can be a shift in position of secondary conveyor 40B that causes the center of gravity (CG) to go outside of operating envelope 190 for machine 10 described above. The threshold condition can be caused or influenced by a drop in liquid level within tank 124, a change in position of secondary conveyor 40B or a change in the orientation of frame 12, as well as combinations thereof. For example, when an instability issue has been determined due to lean conditions, lock valves 128A and 128B can be de-activated to move to a closed position where only one-way flow is allowed through each valve in a check valve configuration. Lock valves 128A and 128B can be configured to check flow in opposite directions. Thus, lock valve 128A can prevent flow to the right in FIG. 3 and lock valve 128B can prevent flow to the left in FIG. 3. When closed, hydraulic fluid becomes trapped in upper chambers 160A and 160B, thereby locking the positions of lifting columns 18A and 18B. With both lock valves 128A and 128B closed, both lifting columns 18A and 18B are locked while float valves 129A and 129B are powered off to the default position of FIG. 3

At step 214, one of float valves 129A and 129B can be operated. In particular, the float valve for the leg away from the direction of lean can be switched. Thus, if machine 10 were tilting to the left, float valve 129B can be switched to connect upper chamber 160B to pressure 184 via float pressure valve 151B. If machine 10 were tilting to the right, float valve 129A can be switched to connect upper chamber 160A to pressure 184 via float pressure valve 151B. As such, the leg away from the direction of lean can be configured to float, e.g., extend or retract as undulating terrain is traversed.

At step 216, closing of lock valves 128A and 128B can prevent lifting columns 18A and 18B from retracting to avoid an instability condition (e.g., movement of the center of gravity (CG) of machine 10 from moving outside of operating envelope 190). The opposite of lifting columns 18A and 18B can be floated to maintain traction with work surface 24, such as by being provided with low pressure fluid of P2 from float pressure valve 151B and low pressure supply valve 151C to maintain the propulsion device connected thereto engaged with terrain. Thus, machine 10 can continue to operate in the stability control mode until the terrain of work surface 24 changes to more level conditions.

From step 216, method 200 can return to step 208 to again monitor the side slope condition. If the side slope condition continues to exceed the threshold condition, lock valves 128A and 128B and float valves 129A-129B can continue to be activated to lock one leg and float the other leg. Method 200 can continue to steps 218A and 218B to adjust the height of the locked leg upward or downward as needed, respectively, such as due to changing slope of work surface 24 while in the stability control mode. Valves 128A-129B can be reset at step 220 if the threshold condition is not met to exit the stability control mode.

At step 218A, the locked leg can be raised, such as by opening the lock valve for the leg in the direction of lean. Thus, for example, pressurized hydraulic fluid can be permitted to enter upper chamber 160A via control valve 149 after lock valve 128B is opened, but is prevented from entering upper chamber 160B by lock valve 128A remaining closed. Likewise, load holding valve 151A can be opened or configured to allow one-way flow into upper chamber 160A.

At step 218B, the locked leg can be lowered, such as by adjusting control valve 149 to connect lower chamber 162A to tank 184. Thus, hydraulic fluid can be permitted to leave upper chamber 160A via control valve 149. Likewise, load holding valve 151A can be opened or configured to allow one-way flow into upper chamber 160A. Both lock valves 128A and 128B can be configured to be closed in a leg lower operation.

At step 220, lock valves 128A-128B and float valves 129A-129B can be reset, such as to a float condition with lock valves 128A and 128B in powered on, open positions, and float valves 129A and 129B deactivated, such as is shown in FIG. 3. Thereafter, cold planer machine 10 can continue to drive and monitor for a threshold situation.

INDUSTRIAL APPLICABILITY

The present application describes various systems and methods for controlling vertical movement of machines including individually mounted propulsion elements or transportation devices. The propulsion elements or transportation devices can be mounted to lifting columns, such as hydraulic cylinders, that can be controlled with a hydraulic system. For example, hydraulic cylinders of a propulsion system can be operated to maintain a desired inclination, orientation or attitude of the machine or to prevent an inclination, orientation or attitude of the machine from going beyond a threshold limit. More specifically, the hydraulic cylinders can be operated to maintain a center of gravity of the machine within an operating envelope that minimizes the risk of instability. The operating envelope for the center of gravity can be increased by allowing rear hydraulic cylinders of the machine to be individually locked out to widen the operating envelope when, for example, a controller for the machine determines that the center of gravity of the machine is close to an edge of the operating envelope. In particular, individual rear lifting columns can be individually locked out in the direction of a lean to prevent the machine from rotating further in that direction. A user can manually operate lock valves and float valves associated with each of the rear lifting columns to put the machine in a stability mode. In other examples, the rear lock valves and float valves can be controlled by a controller based on operator input or sensor input. Individual control of the rear lifting columns can help 1) maintain a desired cut orientation of a milling drum, and 2) maintain stability of machine (e.g., to prevent rollover), and other considerations. As such, construction machines incorporating the various aspects of the present disclosure can increase operating time by being able to operate in a wider variety of terrains and can increase operator safety.

What is claimed is:

1. A machine for roadwork comprising:
a frame;
a plurality of ground engaging units including a first rear ground engaging unit and a second rear ground engaging unit;
a plurality of vertically moveable legs, each leg connecting one of the plurality of ground engaging units to the frame, the plurality of vertically moveable legs including a first rear leg connected to the first rear ground engaging unit and a second rear leg connected to the second rear ground engaging unit; and
a hydraulic system to control a height of each of the plurality of vertically moveable legs, the hydraulic system comprising:
a fluid circuit to control fluid between the first rear leg and the second rear leg;
a load holding valve to let fluid into and out of the fluid circuit;
a control valve system to let fluid into and out of the load holding valve, the control valve connected to a source of pressurized hydraulic fluid and a fluid reservoir;
a first lock valve to control flow of fluid from the first rear leg to the second rear leg in a first direction;
a second lock valve to control flow of fluid from the second rear leg to the first rear leg in a second direction;
a first float valve configured to connect the first rear leg to the control valve system; and
a second float valve configured to connect the second rear leg to the control valve system;
wherein the first and second float valves each comprise two-way valves having a first directional flow configuration and a second directional flow configuration.

2. A machine for road work comprising:
a frame;
a plurality of ground engaging units including a first rear ground engaging unit and a second rear ground engaging unit;
a plurality of vertically moveable legs, each leg connecting one of the plurality of ground engaging units to the frame, the plurality of vertically moveable legs including a first rear leg connected to the first rear ground engaging unit and a second rear leg connected to the second rear ground engaging unit; and
a hydraulic system to control a height of each of the plurality of vertically moveable legs, the hydraulic system comprising:
a fluid circuit to control fluid between the first rear leg and the second rear leg;
a load holding valve to let fluid into and out of the fluid circuit;
a control valve system to let fluid into and out of the load holding valve, the control valve connected to a source of pressurized hydraulic fluid and a fluid reservoir;
a first lock valve to control flow of fluid from the first rear leg to the second rear leg in a first direction;
a second lock valve to control flow of fluid from the second rear leg to the first rear leg in a second direction;
a first float valve configured to connect the first rear leg to the control valve system; and
a second float valve configured to connect the second rear leg to the control valve system,
wherein each of the first and second legs comprises:
a cylinder;
a piston disposed in the cylinder; and
a rod extending from the piston out of the cylinder;
wherein the first and second lock valves connect to piston-ends of the cylinders; and
wherein the first and second float valves connect the first and second lock valves to the load holding valve.

3. The machine for road work of claim 1, wherein the first and second lock valves each comprise two-way valves having a free-flow configuration and a checked-flow configuration.

4. The machine for road work of claim 1, wherein:
the first directional flow configuration of the first and second float valves connects the first and second rear legs to the first and second lock valves; and
the second directional flow configuration of the first and second float valves connects the first and second rear legs to the control valve.

5. The machine for road work of claim 1, wherein the control valve system further comprises:
a low pressure supply valve configured to receive a first fluid pressure from the source of pressurized fluid at an inlet and provide a second fluid pressure at an outlet, the second fluid pressure less than the first fluid pressure; and
a float pressure valve configured to connect the outlet of the low pressure supply valve to the first and second float valves.

6. The machine for road work of claim 1, further comprising a controller configured to receive sensor information related to a center of gravity of the machine for roadwork, the controller configured to operate one of the first and second lock valves in response to determining a center of gravity of the machine for roadwork is at or beyond a threshold center of gravity value.

7. The machine for road work of claim 6, further comprising a multi-axis slope sensor coupled to the frame to detect a pitch and slope of the frame, wherein the multi-axis slope sensor generates the sensor information.

8. The machine for road work of claim 6, further comprising a liquid level sensor for sensing a fluid level in a liquid tank mounted to the machine for road work or a position sensor for a conveyor mounted to the machine for road work for sensing a position of a conveyor relative to the frame, wherein the liquid level sensor or the position sensor generates the sensor information.

9. The machine for road work of claim 6, further comprising a pressure sensor for at least one of the plurality of vertically moveable legs for sensing a hydraulic pressure within the at least one of the plurality of vertically moveable legs, wherein the pressure sensor generates the sensor information.

10. A method for controlling side-to-side slope of a four-legged construction machine having multiple independent propulsors each mounted to a hydraulic lifting device, the method comprising:
adjusting a height of first and second rear hydraulic lifting devices of the multiple independent propulsors by connecting to a high pressure source;
traversing a ground surface having a changing topography with the multiple independent propulsors;
floating individual heights of the first and second rear hydraulic lifting devices in a fluid circuit;

activating a lock valve positioned between the first and second rear hydraulic lifting devices to inhibit flow out of a piston-end of the first rear hydraulic lifting device;

activating a float valve positioned between the lock valve and the second rear hydraulic lifting device to connect a piston-end of the second rear hydraulic lifting device to a low pressure source; and lifting the first rear hydraulic lifting device by:
activating a second lock valve positioned between the first lock valve and the first rear hydraulic lifting device to connect the piston-end of the first rear hydraulic lifting device to the high pressure source.

11. The method of claim 10, wherein the lock valve and the float valve are activated by operator action.

12. The method of claim 10, wherein the lock valve and the float valve are activated when a center of gravity of the four-legged construction machine moves outside an operating envelope.

13. The method of claim 12, wherein the center of gravity of the machine is calculated using a slope sensor.

14. The method of claim 13, wherein the center of gravity of the machine is further calculated using input from a liquid tank level sensor mounted to the four-legged construction machine.

15. The method of claim 13, wherein the center of gravity of the machine is further calculated using input from a position sensor for a conveyor mounted to the four-legged construction machine.

16. The method of claim 10, further comprising moving a control valve to connect a rod-end of the first rear hydraulic lifting device to a tank.

17. A method for controlling side-to-side slope of a four-legged construction machine having multiple independent propulsors each mounted to a hydraulic lifting device, the method comprising:

adjusting a height of first and second rear hydraulic lifting devices of the multiple independent propulsors by connecting to a high pressure source;

traversing a ground surface having a changing topography with the multiple independent propulsors;

floating individual heights of the first and second rear hydraulic lifting devices in a fluid circuit;

activating a lock valve positioned between the first and second rear hydraulic lifting devices to inhibit flow out of a piston-end of the first rear hydraulic lifting device;

activating a float valve positioned between the lock valve and the second rear hydraulic lifting device to connect a piston-end of the second rear hydraulic lifting device to a low pressure source; and lowering the first rear hydraulic lifting device by:
closing the first lock valve; and
moving a control valve to connect a piston-end of the first rear hydraulic lifting device to a tank.

18. The method of claim 10, further comprising moving a control valve to connect rod-ends of the first and second rear hydraulic lifting devices to a tank.

\* \* \* \* \*